(12) United States Patent
Lim

(10) Patent No.: US 10,255,019 B2
(45) Date of Patent: Apr. 9, 2019

(54) DISPLAY CONFIGURATIONS BASED ON APPLICATIONS

(71) Applicant: Hewlett-Packard Development Company, L.P., Houston, TX (US)

(72) Inventor: Ruth Ann Lim, Santa Clara, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 49 days.

(21) Appl. No.: 15/474,206

(22) Filed: Mar. 30, 2017

(65) Prior Publication Data

US 2018/0285049 A1    Oct. 4, 2018

(51) Int. Cl.
  *G06F 3/00*  (2006.01)
  *G06F 3/14*  (2006.01)
  *G09G 5/00*  (2006.01)

(52) U.S. Cl.
  CPC ........... *G06F 3/1446* (2013.01); *G09G 5/006* (2013.01); *G09G 2370/042* (2013.01)

(58) Field of Classification Search
  CPC .... G06F 3/1423; G06F 3/1431; G06F 3/1438; G06F 3/1446; G09G 5/006
  USPC .................................................. 345/1.1–3.4
  See application file for complete search history.

(56) References Cited

U.S. PATENT DOCUMENTS

| 6,928,543 | B2 | 8/2005 | Hendry et al. |
| 2004/0212610 | A1 | 10/2004 | Hamlin |
| 2006/0132473 | A1* | 6/2006 | Fuller ................... G06F 3/1438 345/204 |
| 2009/0256780 | A1* | 10/2009 | Small ................. H04N 1/00127 345/55 |
| 2012/0174020 | A1 | 7/2012 | Bell et al. |
| 2016/0210102 | A1 | 7/2016 | Holland et al. |

OTHER PUBLICATIONS

Microsoft ~ "The Display-aware Application" ~https://msdn.microsoft.com ~ 2006 ~ 3 pages.

* cited by examiner

*Primary Examiner* — Alexander Eisen
*Assistant Examiner* — Cory A Almeida
(74) *Attorney, Agent, or Firm* — Tong, Rea, Bentley & Kim, LLC

(57) ABSTRACT

In example implementations, a method for configuring displays and an apparatus for performing the same is provided. The method is performed by a processor of a computing system having a main display and a projected display having a touch interface. The method includes executing an application that uses the main display, the projected display, and an external display. The main display, the projected display, and the external display are set to an extended display configuration. A list of displays and display data associated with the list of displays is obtained. A display configuration request is received from an application being executed by the processor of the computing system and the main display, the projected display, and the external display are configured in accordance with the display configuration request based on the display data that is obtained.

17 Claims, 4 Drawing Sheets

DISPLAY CONFIGURATIONS BASED ON APPLICATIONS

BACKGROUND

To increase productivity, a user may install multiple displays to a computer. The additional displays may provide a larger viewing area to view documents, windows, programs, and the like. The displays may be arranged as one large continuous display or to duplicate the same content on different displays.

DETAILED DESCRIPTION

The present disclosure relates to an approach of configuring displays in a multiple display system and an apparatus for performing the same. A user may be able to set various different configurations via a setup screen when using multiple displays. For example, the user may be able to set one of the displays as a main display, change resolution settings for each display, change an orientation of each display (e.g., landscape or portrait), and the like, via the setup screen. Although a user may set a particular configuration for multiple displays, the operating system (OS) of the computer may automatically change the configuration of the displays when a display is added or removed.

One type of computing system may use two attached displays. One of the displays may be a main display and the other display may be virtual touch display that includes a touch-sensitive mat located in front of the main display that is configured as a second display via a projector. The computing system may allow for additional displays to be added via a universal serial bus (USB) connection or a video out connector (e.g., a high definition media interface (HDMI) connection).

However, when additional displays are added or removed, the OS may change the configuration of the displays such that the OS designates a different display device to be the primary display. In other words, the main display may no longer be set as a primary display. Rather, an added display may be set as the primary display or some other unexpected configuration may occur. The present disclosure provides an approach to ensure that the main display of the two display computing system is configured as the primary display even when additional displays are added or removed.

Figure 1:
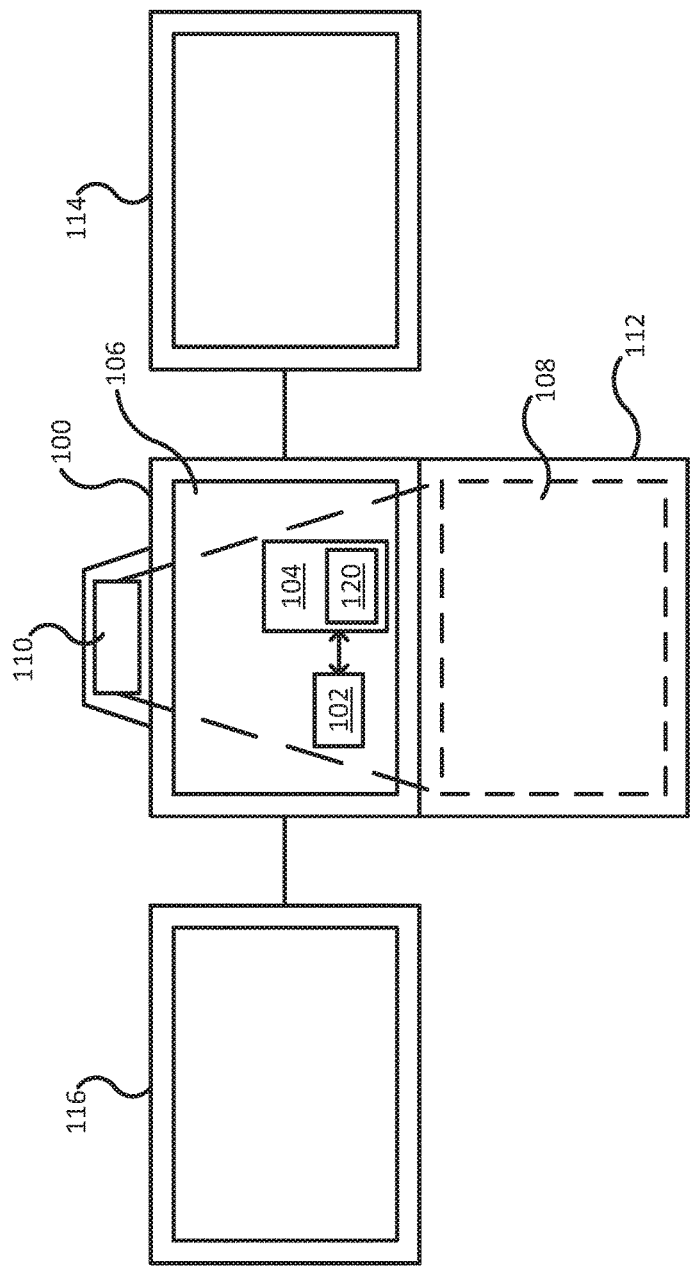
FIG. 1 is a block diagram of an example apparatus that configures a plurality of displays for an application executed by the apparatus of the present disclosure.

FIG. 1 illustrates a block diagram of an apparatus 100 that configures a plurality of displays for an application executed by the apparatus of the present disclosure. The apparatus 100 may be an immersive computing system that uses multiple displays that are integrated as part of the apparatus 100. In one example, the apparatus may include a main display 106 and a projected display 108 having a touch interface. In one example, the main display 106 may be a liquid crystal display (LCD) or light emitting diode (LED) display.

In one implementation, the projected display 108 may be a projected image that is projected by a built-in projector 110 onto a touch sensitive mat 112. The projected image may be a portion of a full image that is displayed on the main display or a completely different image that is unrelated to the full image that is displayed on the main display. The built-in projector 110 may be capable of projecting content on to the touch sensitive mat 112 in a way that matches touch coordinates of the touch sensitive mat 112. As a result, the projected display 108 may have a touch interface via the touch sensitive mat 112.

In some implementations, the touch sensitive mat 112 may rest on a surface perpendicular to the main display 106. In other words, the touch sensitive mat 112 may be coupled to the main display 106 at approximately a 90 degree angle. The touch sensitive mat 112 may work with the projected display 108 to provide a touch interface to the projected display 108. For example, areas of the projected image of the projected display 108 may be selected, moved, or interacted with by touch that is detected by the touch sensitive mat 112.

In one example, the apparatus 100 may also include a processor 102 and a computer readable storage medium 104 that stores instructions including an automatic display configuration application 120. The automatic display configuration application 120 may be executed by the processor 102 when an additional external display 114 (e.g., a monitor such as an LCD monitor, an LED monitor, and the like) is detected. The additional external display 114 may be connected to the apparatus 100 via a video connection such as a universal serial bus (USB) connection, a digital video connection, a high definition media interface (HDMI) connection, and the like. In some examples, more than one additional display may be connected to the apparatus (e.g., an additional external display 116 and the additional external display 114).

Although two additional external displays 114 and 116 are illustrated in FIG. 1, it should be noted that any number of additional external displays may be added. Two additional external displays 114 and 116 are illustrated in FIG. 1 for ease of explanation regarding how the displays are automatically configured by the apparatus 100.

The automatic display configuration application 120 may perform operations that automatically configure the main display 106, the projected display 108 and the additional external display 114 when an application (e.g., a presentation application) that uses the main display 106, the projected display 108 and the additional external display 114 executed on the apparatus 100. For example, the automatic display configuration application 120 may configure the main display 106 to be assigned as a primary display, position the projected display 108 directly below the main display and position the additional external display 114 to a side of the main display. In one example, a default may be to position a single external display to the right of the main display 106. Additional operations of the automatic display configuration application 120 may be discussed in further detail below.

Figure 2:
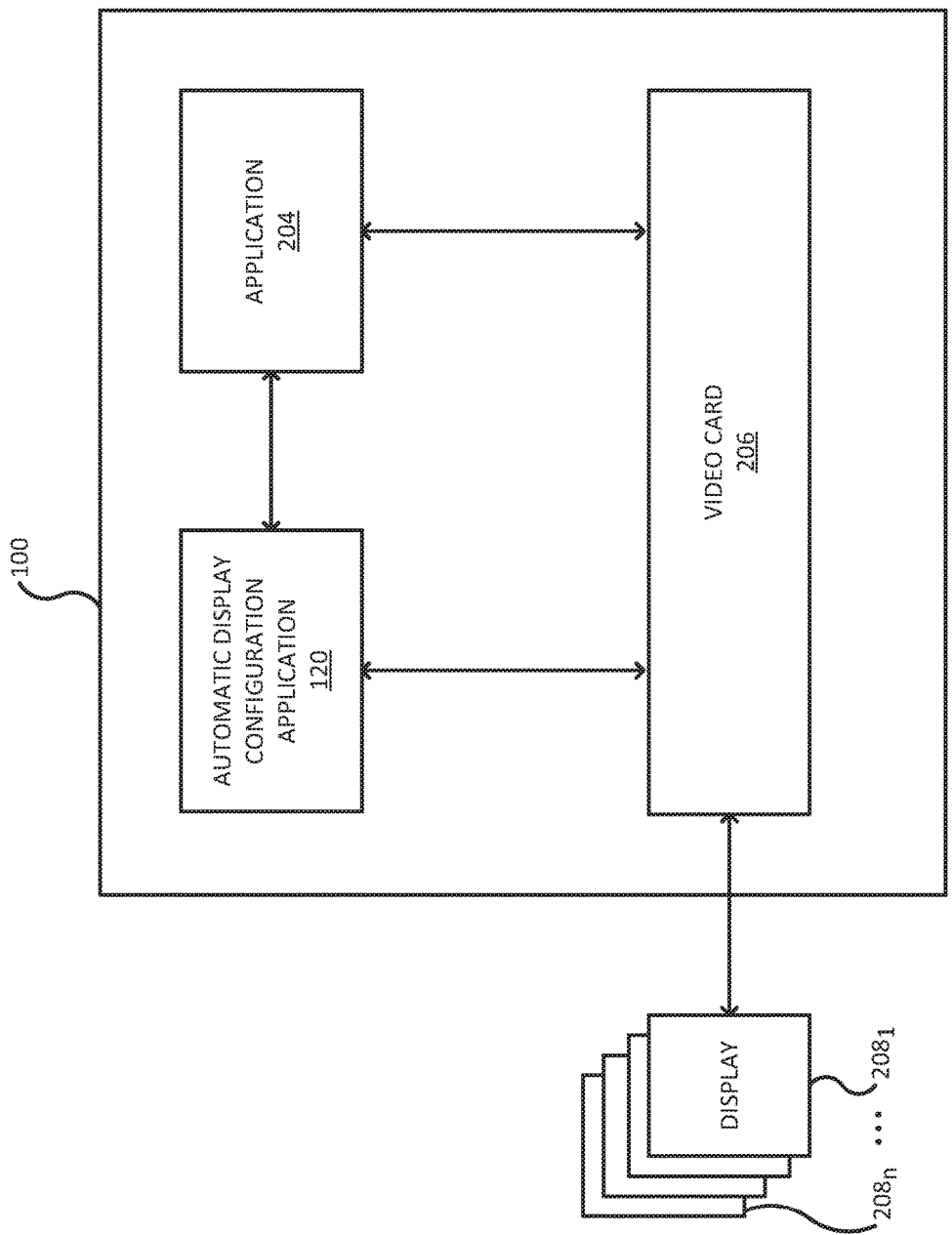
FIG. 2 is a block diagram of components of the apparatus that configure a plurality of displays based on an application of the present disclosure.

FIG. 2 illustrates another block diagram that illustrates components of the apparatus 100 that configure a plurality of displays $208_1$ to $208_n$ based on an application 204. In one example, the apparatus 100 may include the automatic display configuration application (ADCA) 120, the application 204 and a video card 206. It should be noted that the apparatus 100 has been simplified for ease of explanation and may include addition components not shown.

In one example, the plurality of displays $208_1$ to $208_n$ (herein also referred to individually as a display 208 or collectively as displays 208) may be connected to the video card 206. The plurality of displays 208 may include the main display 106, the projected display 108, and the additional external displays 114 and 116 illustrated in FIG. 1

In one implementation, the application 204 may be executed on the apparatus 100. The application 204 may be a presentation application that uses the displays 208. However, many times a user may not know how to configure or set up the displays 208 to be used with the application 204. As a result, if the displays 208 are misconfigured, the user may find it difficult to move content (e.g., icons, images, application windows) from one display 208 to another display 208. The application 204 may put content in the "wrong" display 208 by continuing to place content in the primary display, which the OS may have changed from the main display 106 to another display 208 (e.g., one of the external displays 114 or 116).

Similarly, the user may not know how the OS has mapped the different displays 208 to the virtual extended desktop, especially if the OS has changed the mapping from one created by a more knowledgeable user (e.g., an information technology (IT) administrator). That is, if an IT administrator previously configured the OS display settings to reflect the relative position of the displays 208 in physical space, then a display reassignment by the OS may undo the configuration that created a helpful analog between the displays 208 on the virtual desktop and the displays 208 in the real world. When that happens, a user may have to move content down and to the left on the virtual extended desktop to get it to show on a display $208_2$ that is physically up and to the right of a display $208_1$ that is the main display 106. This may be in contrast to an intention of the IT administrator that had intended the user to use a more intuitive gesture following "an up and to the right" path.

In another example, the user may believe he or she is moving an image from a display $208_1$ that is the main display 106 to a display $208_2$ that is the additional external display 114 on the right side of a classroom. However, the displays $208_1$ and $208_2$ may be misconfigured such that the display $208_2$ is actually the projected display 108. As a result, the image may disappear when the user moves the image off to the right thinking he or she is moving it to the additional external display 114.

In one implementation, to prevent this type of misconfiguration, the application 204 may call the ADCA 120 when the application 204 is initially executed. The ADCA 120 may execute a series of Windows® application programming interface (API) calls to automatically configure the displays 208. In one implementation, the ADCA 120 may issue a call to execute a EnumDisplayDevices API to obtain a list of the displays 208 connected to the video card 206 and display data associated with each one of the displays 208 (e.g., a name of the display). In one example, the display data associated with the displays 208 may be stored in the computer readable storage medium 104.

After receiving the display data associated with the displays 208, the ADCA 120 may issue a call to execute a SetDisplayConfig API and set all of the displays to operate in an extended mode. For example, the extended mode may configure the displays 208 to operate as a combined single display where each one of the displays 208 represents a different set of coordinates within the combined single display.

The ADCA 120 may receive a requested display configuration from the application 204. For example, the application 204 may request that the main display 106 be set as a primary display that is located in a center, that the projected display 108 be located in the center and below the main display 106 and that the additional external displays 114 and 116 be located to each side of the main display 106 at a height level to the main display 106. The ADCA 120 may identify the main display 106 and the projected display 108 based on a comparison of a known hardware name of the main display 106 and the projected display 108 stored in the computer readable storage medium 104 of the apparatus 100 and the list of the displays 208 that are connected to the video card 206.

The display 208 that is identified as the main display 106 may be set as a primary display by the ADCA 120. The display 208 that is identified as the projected display 108 may be configured to be positioned below the main display 106. The remaining displays 208 in the obtained list of displays 208 may be set as the additional external displays 114 and 116 by the ADCA 120 and positioned to a right side of the main display 106 and a left side of the main display 106, respectively.

After the displays 208 are configured by the ADCA 120 in accordance with the configuration request from the application 204, the ADCA 120 may calculate a desired display setting for each display. The desired display setting may be set be executing a ChangeDisplaySettingsEx API. The ADCA 120 may then check to see if the result of the display settings is operating as expected. For example, the pixel (0,0) in the additional external display 116 should be the uppermost left corner of the combined single display, a center pixel of the main display 106 should be a center of the combined single display, a last pixel of the additional external display 114 should be a lowermost right corner of the combined single display, and so forth.

In addition, the ADCA 120 may register a system DisplayChange event API in the application 204. The DisplayChange event API may detect when a change to the displays 208 connected to the video card 206 is detected. For example, the change may include detecting a new display 208 that is added to the video card 206 or detecting one of the configured displays 208 being disconnected form the video card 206. When the change is detected the DisplayChange event API may cause the application 204 to re-execute the ADCA 120 to ensure that the displays 208 are configured in accordance with the configuration requested by the application 204.

In one implementation, the ADCA 120 may read configuration information that was pre-defined by an administrator and stored in the computer readable storage medium 104. Thus, the ADCA 120 may configure the displays 208 back to a configuration was pre-defined by the administrator. The pre-defined configuration stored in the computer readable storage medium 104 may override a configuration suggested by the ADCA 120 based on the information collected from the API calls.

As a result, the present disclosure allows a computing system to automatically configure a set of external displays connected to the computing system that has a main display and a projected display. The complication of configuring a number of displays for a particular application (e.g., labeling the displays properly, setting a proper orientation relative to the other displays, setting a proper resolution for each display, and the like) may be removed from a user. The examples of the present disclosure may automatically configure displays in additional scenarios where a user may suddenly remove an active display or connect an additional display.

Figure 3:
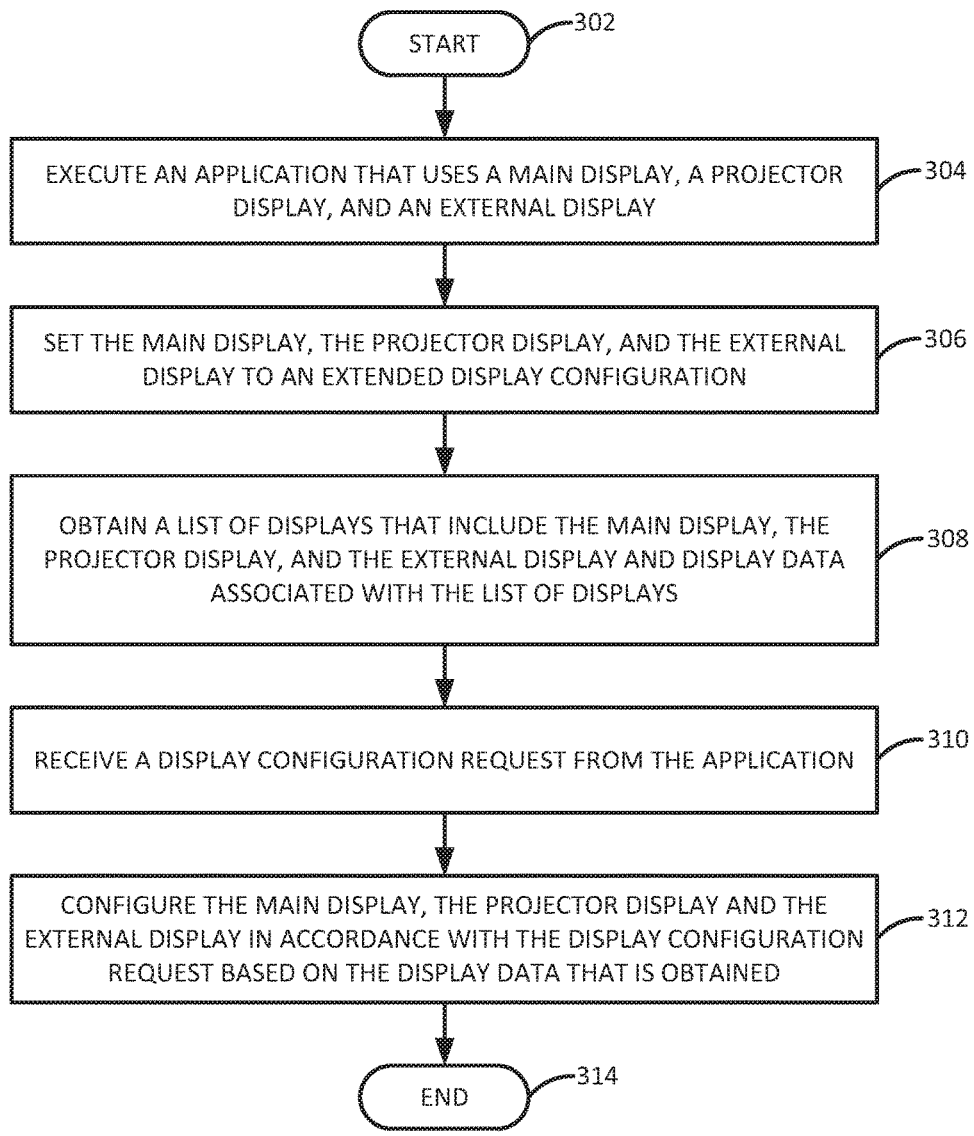
FIG. 3 is a block diagram of an example method for configuring displays based on an application.

FIG. 3 illustrates a flow diagram of an example method 300 for configuring displays based on an application. In one example, the method 300 may be performed by the apparatus 100.

At block 302, the method 300 begins. At block 304, the method 300 executes an application that uses a main display, a projected display, and an external display. For example, the application may be a presentation that uses the main display and the projected display of a computing system and an external display that is connected to the computing system. One example may be a class room environment where a professor may be using the computing system and have a plurality of additional external displays connected to the computing system and located around the classroom. The professor may focus in on a particular part of an image on the main display by using the projected display. The touch sensitive mat may allow the professor to interact with the projected display while the students watch on the additional external displays. The application may allow the professor to throw portions of the image from the main display or the projected display to any one of the additional external displays.

At block 306, the method 300 sets the main display, the projected display, and the external display to an extended display configuration. For example, the computing system may have an automatic display configuration application (ADCA) that issues a series of APIs in response to execution of the application. One of the APIs may set the main display, the projected display, and the external display to operate in the extended display mode or configuration.

At block 308, the method 300 obtains a list of displays that include the main display, the projected display, and the external display and display data associated with the list of displays. For example, the ADCA may issue another API call to obtain a list of displays connected to a video adapter or video card of the computing system and display data associated with each one of the displays. The list of displays and the associated display data may be stored in memory of the computing system.

At block 310, the method 300 receives a display configuration request from the application. The application may request that the displays be configured in a particular way. For example, the application may want the main display to be set as a primary display that is a center of the combined single display of the extended display configuration. The application may want the projected display to be a first secondary display located directly below the main display and the external display to be a second secondary display located to a side of the main display at a height that is level to the main display. Additional external displays that are added may be subsequent secondary displays that are located to either side of the main display.

At block 312, the method 300 configures the main display, the projected display, and the external display in accordance with the display configuration request based on the display data that is obtained. For example, the ADCA may identify the main display and the projected display from the obtained list of displays based on known hardware names that are stored in the computing system. The ADCA may use an API call to set the configuration in accordance with the display configuration request from the application after identifying the main display, the projected display, and the external display.

In one implementation, the ADCA may register an API on the application to detect a change display event. For example, the display change event may be detecting a new display has been connected to the computing system or a configured display has been disconnected from the computing system while the application is being executed. When a change display event is detected, the application may request that the ADCA perform operations in response to detecting the change display event to ensure that the displays are properly configured. As a result, the method 300 may be performed again.

For example, the method 300 may repeat the block of obtaining a list of displays, receiving the display configuration request from the application and configuring the displays. As a result, an updated list of displays and updated display data associated with the updated list of displays may be obtained.

In one implementation, when the method 300 is repeated, the method 300 may use the display data stored when the method 300 was initially performed. As a result, the method 300 may repeat block 312 without repeating the block 308 related to obtaining the list of displays. In other words, the method 300 may be repeated without having to obtain the list of displays again and obtaining the associated display data. At block 314, the method 300 ends.

Figure 4:
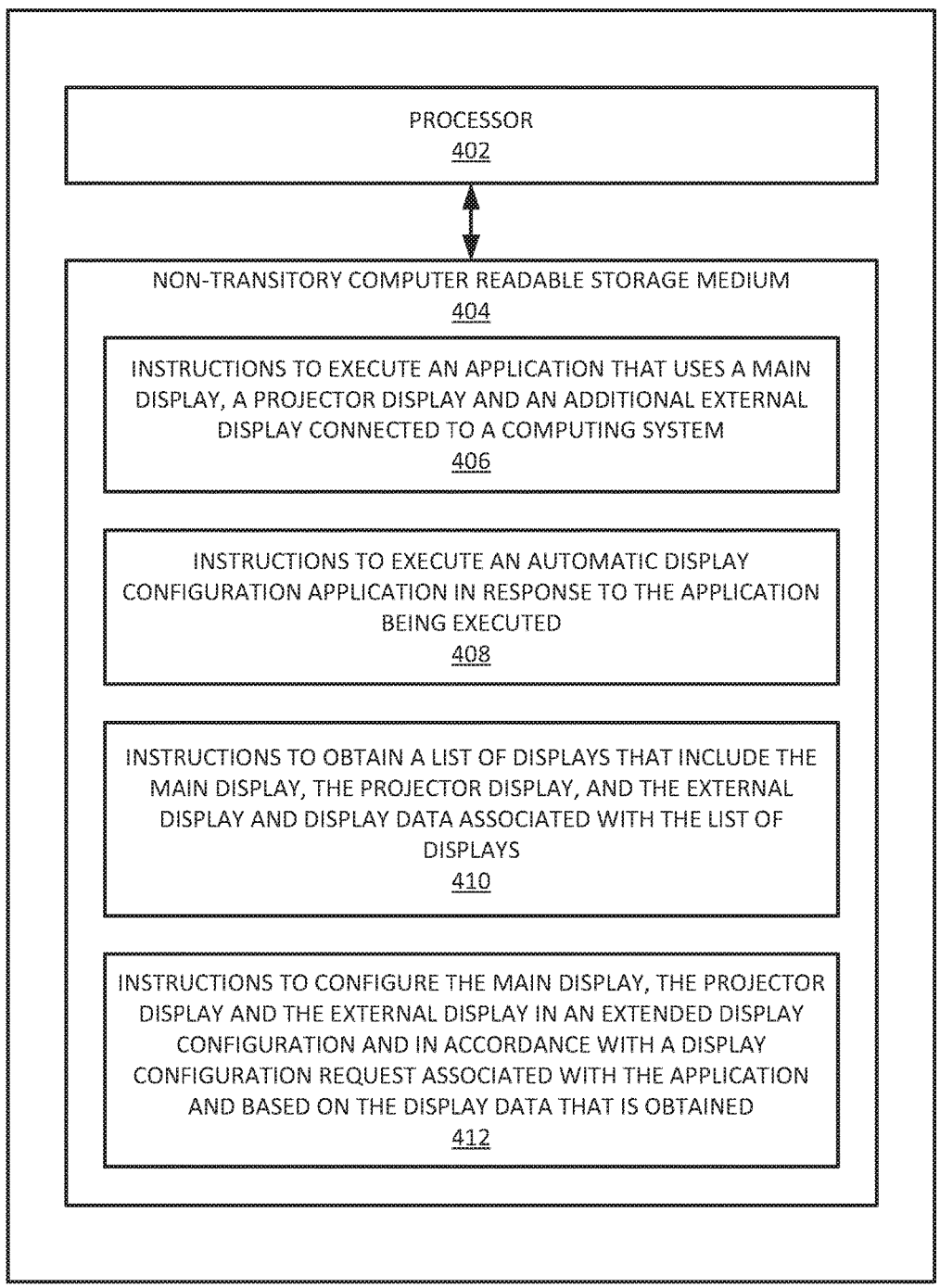
FIG. 4 is a block diagram of an example apparatus of the present disclosure having a non-transitory computer readable medium storing instructions executed by a processor to configure displays based on an application that is executed by the apparatus.

FIG. 4 illustrates an example of an apparatus 400. In one example, the apparatus 400 may be the apparatus 100. In one example, the apparatus 400 may include a processor 402 and a non-transitory computer readable storage medium 404. The non-transitory computer readable storage medium 404 may include instructions 406, 408, 410, and 412 that when executed by the processor 402, cause the processor 402 to perform various functions.

In one example, the instructions 406 may include instructions to execute an application that uses the main display, the projected display and an additional external display connected to the computing system. The instructions 408 may include instructions to execute an automatic display configuration application in response to the application being executed. The instructions 410 may include instructions to obtain a list of displays that include the main display, the projected display, and the external display and display data associated with the list of displays. The instructions 412 may include instructions to configure the main display, the projected display, and the external display in an extended display configuration and in accordance with a display configuration request associated with the application and based on the display data that is obtained.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method, comprising:
    executing, by a processor of a computing system having a main display and a projected display having a touch interface, an application that uses the main display, the projected display, and an external display, wherein the projected display comprises a built-in projector over the main display that projects an image onto a touch sensitive mat coupled to the main display;

setting, by the processor, the main display, the projected display, and the external display to an extended display configuration of a combined single display;

obtaining, by the processor, a list of displays that includes the main display, the projected display, and the external display and display data associated with the list of displays;

receiving, by the processor, a display configuration request from the application;

configuring, by the processor, the main display, the projected display, and the external display in accordance with the display configuration request based on the display data that is obtained, wherein the display configuration request comprises setting the main display as a primary display, setting the projected display as a first secondary display that is located directly below the main display and setting the external display as a second secondary display that is located to a right side of the main display; and checking, by the processor, that the pixel (0,0) in the external display is an uppermost left corner of the combined single display, a center pixel of the main display is a center of the combined single display, and a last pixel is a lowermost right corner of the combined single display.

2. The method of claim 1, wherein the setting and the obtaining is performed by an application programming interface (API) call of an operating system of the computing system.

3. The method of claim 2, wherein the API call of the operating system obtains the list of displays based on displays that are connected to a video adapter of the computing system.

4. The method of claim 1, comprising:
detecting, by the processor, a change display event; and
configuring, by the processor, the main display, the projected display, and the external display in response to the change display event.

5. The method of claim 4, wherein the change display event comprises the external display being disconnected while the application is being executed by the processor.

6. The method of claim 4, wherein the change display event comprises an additional external display being added while the application is being executed by the processor.

7. The method of claim 4, wherein the configuring comprises using the display data in response to the change display event.

8. The method of claim 4, wherein the configuring comprises obtaining an updated list of displays and updated display data associated with the updated list of displays.

9. A non-transitory computer readable storage medium encoded with instructions executable by a processor of a computing system having a main display and a projected display having a touch interface, the non-transitory computer-readable storage medium comprising:
instructions to execute an application that uses the main display, the projected display, and an additional external display connected to the computing system, wherein the projected display comprises a built-in projector over the main display that projects an image onto a touch sensitive mat coupled to the main display;
instructions to execute an automatic display configuration application in response to the application being executed;
instructions to obtain a list of displays that include the main display, the projected display, and the external display and display data associated with the list of displays;
instructions to configure the main display, the projected display, and the external display in an extended display configuration of a combined single display and in accordance with a display configuration request associated with the application and based on the display data that is obtained, wherein the display configuration request comprises setting the main display as a primary display, setting the projected display as a first secondary display that is located directly below the main display and setting the external display as a second secondary display that is located to a right side of the main display; and
instructions to check that the pixel (0,0) in the external display is an uppermost left corner of the combined single display, a center pixel of the main display is a center of the combined single display, and a last pixel is a lowermost right corner of the combined single display.

10. The non-transitory computer readable storage medium of claim 9, wherein the automatic display configuration application comprises a series of application programming interface (API) calls of an operating system of the computing system.

11. The non-transitory computer readable storage medium of claim 10, wherein the instructions to obtain comprises making an API call to identify displays connected to a video adapter of the computing system.

12. The non-transitory computer readable storage medium of claim 9, comprising:
instructions to detect a change display event; and
instructions to re-execute the automatic display configuration application in response to the change display event.

13. The non-transitory computer readable storage medium of claim 12, wherein the change display event comprises the external display being disconnected while the application is being executed by the processor.

14. The non-transitory computer readable storage medium of claim 12, wherein the change display event comprises an additional external display being added while the application is being executed by the processor.

15. The non-transitory computer readable storage medium of claim 12, wherein the automatic display configuration application is re-executed using the display data in response to the change display event.

16. The non-transitory computer readable storage medium of claim 12, wherein the automatic display configuration application is re-executed based on an updated list of displays and updated display data associated with the updated list of displays.

17. An apparatus, comprising:
a main display;
a projected display having a touch interface, wherein the projected display comprises a built-in projector over the main display that projects an image onto a touch interface comprising a touch sensitive mat coupled to the main display;
a computer readable storage medium storing instructions for an automatic display configuration application; and
a processor in communication with the main display, the projected display, and the computer readable storage medium, wherein the processor is to execute a display configuration request from the automatic display configuration application when an external display is detected and an application that uses the main display, the projected display, and the external display is executed, wherein the display configuration request comprises setting the main display as a primary display, setting the projected display as a first secondary display that is located directly below the main display and setting the external display as a second secondary display that is located to a right side of the main display in an extended display configuration of a combined single display and to check that the pixel (0,0) in the external display is an uppermost left corner of the combined single display, a center pixel of the main display is a center of the combined single display, and a last pixel is a lowermost right corner of the combined single display.

* * * * *